No. 707,068. Patented Aug. 19, 1902.
E. I. ALLEN.
NON-REFILLABLE BOTTLE.
(Application filed Jan. 31, 1902.)
(No Model.)
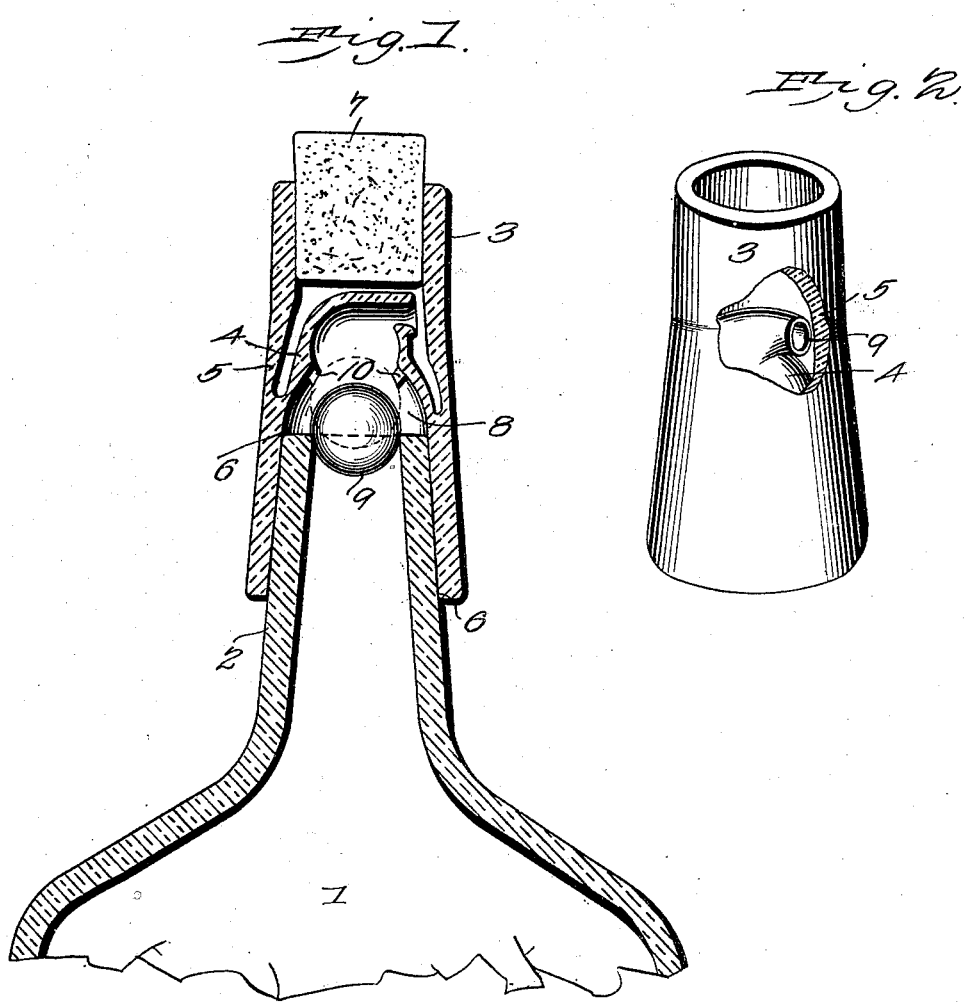
Witnesses
E. F. Stewart
N. F. Riley
E. I. Allen, Inventor.
by C. A. Snow & Co
Attorneys
THE NORRIS PETERS CO., PHOTO-LITHO., WASHINGTON, D. C.

UNITED STATES PATENT OFFICE.

EDWARD I. ALLEN, OF BEAUMONT, TEXAS.

NON-REFILLABLE BOTTLE.

SPECIFICATION forming part of Letters Patent No. 707,068, dated August 19, 1902.

Application filed January 31, 1902. Serial No. 92,029. (No model.)

*To all whom it may concern:*

Be it known that I, EDWARD I. ALLEN, a citizen of the United States, residing at Beaumont, in the county of Jefferson and State of Texas, have invented a new and useful Non-Refillable Bottle, of which the following is a specification.

The invention relates to improvements in non-refillable bottles.

The object of the present invention is to improve the construction of non-refillable bottles and to provide an exceedingly simple and inexpensive one capable of effectually preventing a bottle from being refilled or its contents adulterated and adapted to permit the contents of a bottle to be readily decanted.

A further object of the invention is to provide a simple and inexpensive device adapted to be applied to an ordinary bottle after the latter has received its original contents and capable of preventing a liquid from being introduced into the bottle.

The invention consists in the construction and novel combination and arrangement of parts hereinafter fully described, illustrated in the accompanying drawings, and pointed out in the claims hereto appended.

In the drawings, Figure 1 is a vertical sectional view of a portion of a bottle provided with an attachment constructed in accordance with this invention. Fig. 2 is a detail perspective view of the attachment, the outer casing or shell being partially broken away.

Like numerals of reference designate corresponding parts in both figures of the drawings.

1 designates a bottle having a neck 2, arranged within an attachment 3, which is placed on the bottle after the same has received its original contents and which is adapted to prevent the introduction of a liquid into a bottle, whereby the bottle is prevented from being refilled or its contents adulterated. The attachment 3 consists of inner and outer shells or casings 4 and 5, connected at the base of the attachment and forming an annular space around the upper portion of the inner shell or casing. The lower portion of the device forms a socket 6 for the reception of the upper portion of the neck of a bottle, which may be secured to the neck in any suitable manner which will effectually prevent the removal of the attachment. This means for securing the attachment may consist of cementing the same to the neck of the bottle, or the attachment, which is constructed of glass or analogous material, may be annealed, and the upper portion of the outer shell or casing is adapted to receive an ordinary cork or stopper 7. The upper portion of the inner shell or casing is arched over the bottle to form a chamber 8, and the said inner casing is provided at the top with an approximately horizontally disposed spout 9, consisting of a short tube having its mouth or outer end arranged adjacent to the inner face of the wall of the outer shell or casing, so as to effectually prevent the introduction of an instrument into the inner shell or casing.

The chamber or compartment 8 is designed to receive a valve 9, which may be in the form of a ball, as illustrated in Fig. 1, but which may be of any other desired construction. The valve closes automatically when the bottle is in an upright position, and it opens automatically when the bottle or other receptacle is inverted for decanting its contents, and when open it is offset from the top of the inner casing by projections 10. The inner shell or casing forms an effective guard or shield for preventing the valve from being tampered with by a wire or tool, and the outer shell or casing is extended a sufficient distance beyond the inner shell or casing to provide ample space for an ordinary cork or stopper to enable the bottle or other receptacle to be sealed in the usual manner. It will also be apparent that the upper edge of the neck of an ordinary bottle is adapted to form a seat for the valve and that the latter is retained in position when the parts are assembled.

What I claim is—

An attachment for bottles provided at its bottom with a neck-receiving socket and composed of inner and outer shells, the outer shell being extended above the inner shell to receive a cork, and the inner shell being closed at the top and provided with a laterally-extending spout, substantially as described.

In testimony that I claim the foregoing as my own I have hereto affixed my signature in the presence of two witnesses.

EDWARD I. ALLEN.

Witnesses:
R. G. BOONE,
B. RICHARDSON.